US012654455B2

(12) United States Patent
Yoon et al.

(10) Patent No.: US 12,654,455 B2
(45) Date of Patent: Jun. 16, 2026

(54) PROCESSING LIQUID PROVIDING APPARATUS AND SUBSTRATE TREATING SYSTEM INCLUDING THE SAME

(71) Applicant: SEMES CO., LTD., Chungcheongnam-do (KR)

(72) Inventors: Dai Geon Yoon, Chungcheongnam-do (KR); Soo Hong Lee, Gyeonggi-do (KR); Dong Hwa Lee, Chungcheongnam-do (KR); Ji Hyeon Kim, Chungcheongnam-do (KR); Sang Hwa Lee, Chungcheongnam-do (KR); Dae Sung Kim, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 92 days.

(21) Appl. No.: 18/091,187

(22) Filed: Dec. 29, 2022

(65) Prior Publication Data

US 2023/0211612 A1 Jul. 6, 2023

(30) Foreign Application Priority Data

Dec. 30, 2021 (KR) ........................ 10-2021-0193208
Jun. 15, 2022 (KR) ........................ 10-2022-0072768

(51) Int. Cl.
*B41J 2/175* (2006.01)
*G02B 5/20* (2006.01)
(52) U.S. Cl.
CPC ........... *B41J 2/17513* (2013.01); *G02B 5/207* (2013.01)
(58) Field of Classification Search
CPC . B41J 2/175; B41J 2/17513; B41J 2/18; B41J 2/17596; B41J 2/19; B41J 2/2114; G02B 5/207; H01L 21/67017; H01L 21/30
See application file for complete search history.

(56) References Cited

U.S. PATENT DOCUMENTS 10,752,012 B2 8/2020 Lee et al.
11,654,691 B2 5/2023 Park
(Continued)

FOREIGN PATENT DOCUMENTS

CN 106965564 7/2017
CN 106965564 A * 7/2017 .......... B41J 2/17513
(Continued)

OTHER PUBLICATIONS

Office Action dated Dec. 5, 2023 for Japanese Patent Application No. 2022-206267 and its English machine translation by Google Translate.

(Continued)

*Primary Examiner* — Jannelle M Lebron
(74) *Attorney, Agent, or Firm* — WOMBLE BOND DICKINSON (US) LLP

(57) ABSTRACT

Provided are an apparatus for providing a substrate processing liquid having an optimal structure in the correlation between securing internal agitation fluidity and recovery of sloshing, and a substrate processing system including the same. The apparatus for providing substrate processing liquid comprises a storage tank for storing substrate processing liquid, and a partition wall installed inside the storage tank and for dividing an internal space of the storage tank, wherein the apparatus is connected to a substrate processing apparatus for discharging the substrate processing liquid onto a substrate to provide the substrate processing liquid to the substrate processing apparatus, wherein the partition wall includes a plurality of holes formed passing through one surface and the other surface.

14 Claims, 22 Drawing Sheets

(56)                    References Cited

U.S. PATENT DOCUMENTS

2012/0037071 A1    2/2012  Shiono
2022/0258489 A1*   8/2022  Park ........................... B41J 2/20

FOREIGN PATENT DOCUMENTS

| | | |
|---|---|---|
| JP | 11-133630 | 5/1999 |
| JP | 2012-35594 | 2/2012 |
| JP | 2014-100685 | 6/2014 |
| KR | 10-2098814 | 4/2020 |
| KR | 10-2020-0070676 A | 6/2020 |
| KR | 10-2139137 | 7/2020 |
| KR | 10-2021-0082646 | 7/2021 |
| KR | 10-2301582 B1 | 9/2021 |

OTHER PUBLICATIONS

Office action from the corresponding Korean Patent Application No. 10-2022-0072768 dated Mar. 12, 2024 with English translation from Global Dossier.
Office Action dated Sep. 1, 2025 for Chinese Patent Application No. 202211655118.9 and its English translation from Global Dossier.

* cited by examiner

310

350a  350b

+30

10 ← 20

-30

310

310

510

520

30

20

10

PROCESSING LIQUID PROVIDING APPARATUS AND SUBSTRATE TREATING SYSTEM INCLUDING THE SAME

This application claims the benefit of Korean Patent Application No. 10-2021-0193208 and 10-2022-0072768, filed on Dec. 30, 2021 and Jun. 15, 2022, in the Korean Intellectual Property Office, the disclosure of which is incorporated herein by reference in its entirety.

BACKGROUND

1. Field

The present invention relates to substrate processing liquid providing apparatus and a substrate processing system including the same. More particularly, it relates to an apparatus for providing substrate processing liquid that can be applied to an inkjet facility, and a substrate processing system including the same.

2. Description of the Related Art

When performing a printing process (e.g., RGB patterning) on a transparent substrate to manufacture a display device such as an LCD panel, PDP panel, LED panel, etc., a printing equipment having an inkjet head unit may be used.

SUMMARY

The reservoir is a device for storing a processing liquid (i.e., ink) to be provided to the inkjet head unit, and the inkjet head unit may receive the processing liquid from the reservoir and discharge it onto a substrate.

The reservoir may have a structure including a dead zone in order to prevent the processing liquid from sloshing therein. However, this structure of the reservoir may cause a decrease in the fluidity of the processing liquid in terms of internal agitation, and when the processing liquid contains a large amount of particles, problems such as aggregation, sedimentation between particles, floating, and phase separation may occur.

The object of the present invention is to provide an apparatus for providing a substrate processing liquid having an optimal structure in the correlation between securing internal agitation fluidity and recovery of slothing, and a substrate processing system including the same.

The objects of the present invention are not limited to the technical problems mentioned above, and other objects not mentioned will be clearly understood by those skilled in the art from the following description.

One aspect of the apparatus for providing substrate processing liquid of the present invention for achieving the above object comprises a storage tank for storing substrate processing liquid; and a partition wall installed inside the storage tank and for dividing an internal space of the storage tank, wherein the apparatus is connected to a substrate processing apparatus for discharging the substrate processing liquid onto a substrate to provide the substrate processing liquid to the substrate processing apparatus, wherein the partition wall includes a plurality of holes formed passing through one surface and the other surface.

The substrate processing liquid providing apparatus further comprises a first tube for inflowing the substrate processing liquid circulated between the storage tank and the substrate processing apparatus into the storage tank.

Wherein the hole is formed to the same height as an inlet of the first tube, or is formed to a height lower than the inlet.

The substrate processing liquid providing apparatus further comprises a second tube for discharging the substrate processing liquid stored in the storage tank to the substrate processing apparatus, wherein an inlet of the first tube is disposed above an outlet of the second tube.

Wherein the hole is formed up to the same height as an outlet of the second tube, or is formed up to a height higher than the outlet.

Wherein the partition wall is plural, and a plurality of partition walls are formed in a direction from an inner end of the storage tank to the other end.

Wherein at least some of the plurality of partition walls does not contact the other end.

Wherein at least some of the plurality of partition walls are formed in a direction different from that of other partition walls.

Wherein at least some of the plurality of partition walls cross other partition walls.

Wherein the partition wall is coupled to a cover covering an upper portion of the storage tank.

Wherein material of the partition wall is different according to a type of the substrate processing liquid.

Wherein a size of the partition wall is different according to an inner diameter or area of the storage tank.

The substrate processing liquid providing apparatus further comprises a first pump for agitating the substrate processing liquid stored in the storage tank; and a second pump for circulating the substrate processing liquid between the storage tank and the substrate processing apparatus.

Wherein the second pump is disposed below the first pump.

Wherein the first pump is a magnetic pump operating in a magnetic levitation method.

Wherein the first pump operates in response to the substrate processing liquid containing a particle of a predetermined size or larger.

Wherein the partition wall is plural, and a plurality of partition walls are disposed at equal intervals.

Wherein the partition wall includes a margin region, in which the hole is not formed.

Another aspect of the apparatus for providing a substrate processing liquid of the present invention for achieving the above object, wherein the apparatus is connected to a substrate processing apparatus for discharging the substrate processing liquid onto a substrate to provide the substrate processing liquid to the substrate processing apparatus, comprises a storage tank for storing the substrate processing liquid; a partition wall installed inside the storage tank, and for dividing an internal space of the storage tank, and including a plurality of holes formed passing through one surface and the other surface; a first tube for inflowing the substrate processing liquid circulated between the storage tank and the substrate processing apparatus into the storage tank; and a second tube for discharging the substrate processing liquid stored in the storage tank to the substrate processing apparatus, wherein the inlet of the first tube is disposed above the outlet of the second tube, and the height of the partition wall is determined between the inlet of the first tube and the outlet of the second tube, and the hole is selected based on at least one region among the inlet of the first tube and the outlet of the second tube.

One aspect of the apparatus for processing a substrate of the present invention for achieving the above object comprises a substrate processing apparatus for discharging a substrate processing liquid onto a substrate to process the substrate; a substrate processing liquid providing apparatus connected to the substrate processing apparatus and for providing the substrate processing liquid to the substrate processing apparatus; and a controller for controlling the substrate processing apparatus and the substrate processing liquid providing apparatus; wherein the substrate processing liquid providing apparatus comprises a storage tank for storing the substrate processing liquid; and a partition wall installed inside the storage tank and for dividing an internal space of the storage tank, wherein the partition wall includes a plurality of holes formed passing through one surface and the other surface.

The substrate processing apparatus comprises an inkjet head unit, and discharges the substrate processing liquid onto the substrate by using the inkjet head unit.

Wherein the substrate processing liquid is quantum dot ink.

One aspect of the method for processing a substrate of the present invention for achieving the above object comprises agitating substrate processing liquid stored in a storage tank using a first pump; circulating the substrate processing liquid between the storage tank and the substrate processing apparatus using a second pump; and processing a substrate using the substrate processing apparatus.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
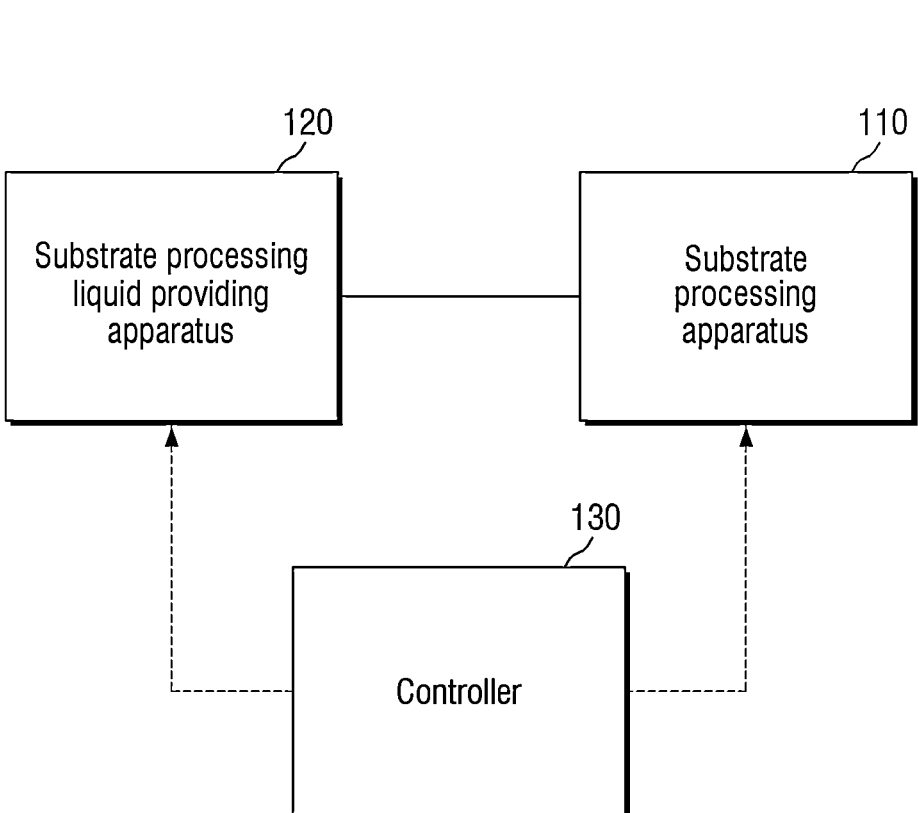
FIG. 1 is a block diagram schematically illustrating an internal configuration of a substrate processing system according to an embodiment of the present invention.

Hereinafter, embodiments of the present invention will be described in detail with reference to the accompanying drawings. The same reference numerals are used for the same components in the drawings, and duplicate descriptions thereof are omitted.

In the case of a substrate processing system that discharges a substrate processing liquid onto a substrate by using an inkjet head unit, a circulating structure of the substrate processing liquid is required in order to minimize defective impact. Accordingly, a structure that can prevent sloshing while smoothing the internal agitation fluidity of the substrate processing liquid is required for the substrate processing liquid providing apparatus. The present invention provides an apparatus for providing a substrate processing liquid having an optimal structure in the correlation between securing internal agitation fluidity and recovery of sloshing, and a substrate processing system including the same. Hereinafter, the present invention will be described in detail with reference to drawings and the like.

FIG. 1 is a block diagram schematically illustrating an internal configuration of a substrate processing system according to an embodiment of the present invention. Referring to FIG. 1, a substrate processing system 100 may include a substrate processing apparatus 110, a substrate processing liquid providing apparatus 120, and a controller 130.

The substrate processing apparatus 110 processes a substrate G (e.g., a glass substrate) used for manufacturing a display device. The substrate processing apparatus 110 may be provided as an inkjet facility for printing the substrate G by jetting the substrate processing liquid onto the substrate G using an inkjet head unit.

The substrate processing apparatus 110 may use ink as a substrate processing liquid. Here, the substrate processing liquid refers to a chemical liquid used to print the substrate G. The substrate processing liquid may be, for example, quantum dot (QD) ink including ultrafine semiconductor particles, and the substrate processing apparatus 110 may be provided with an inkjet facility for forming color filters. (CF; Color Filter) on the substrate (G) using, for example, quantum dot (QD) ink. The substrate processing apparatus 110 may perform pixel printing on the substrate G using the substrate processing liquid, and be provided as a circulation system inkjet facility to prevent the nozzles from being clogged by the substrate processing liquid.

Figure 2:
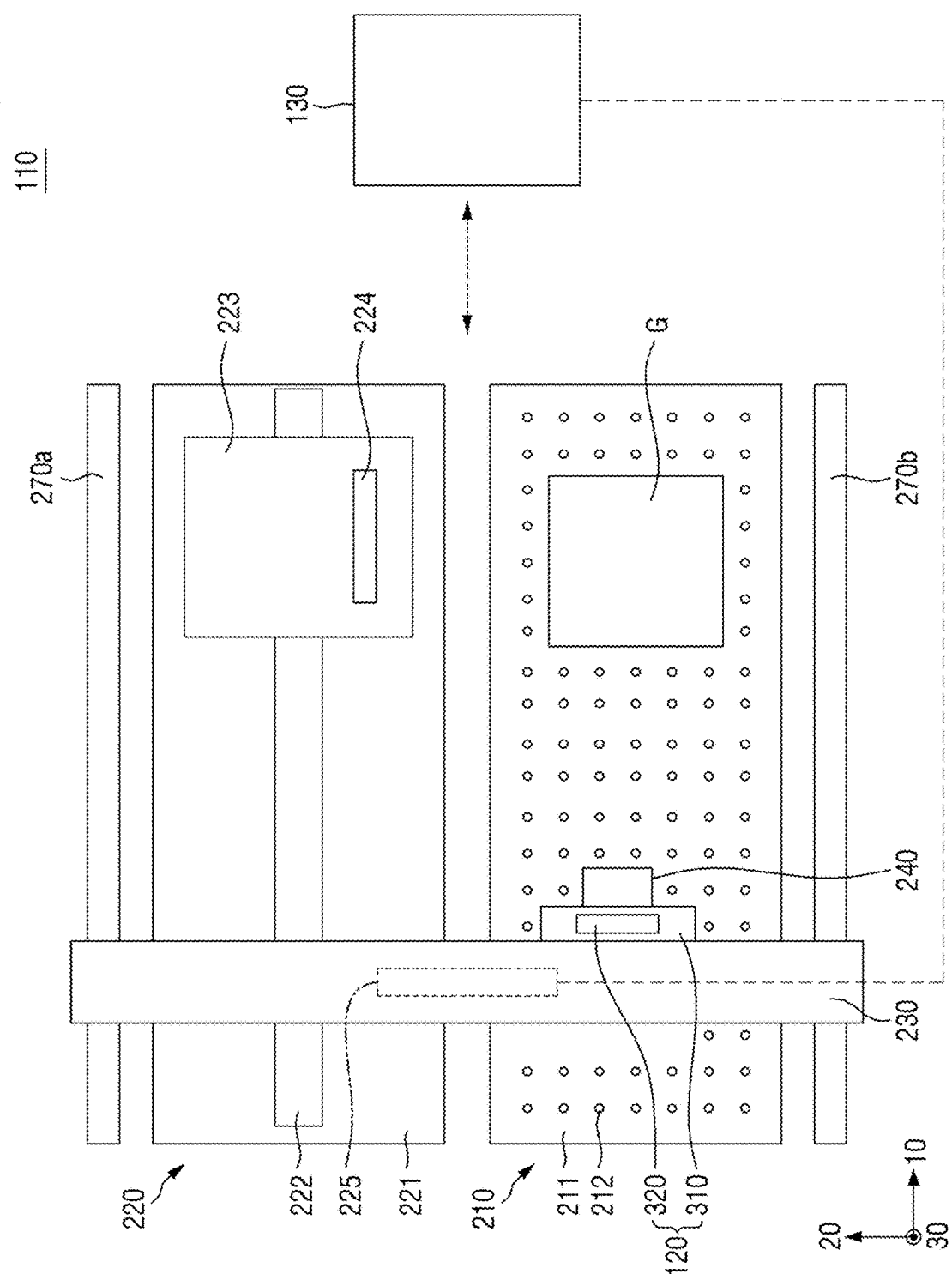
FIG. 2 is a diagram schematically illustrating a structure of a substrate processing apparatus constituting a substrate processing system according to an embodiment of the present invention.

FIG. 2 is a diagram schematically illustrating a structure of a substrate processing apparatus constituting a substrate processing system according to an embodiment of the present invention. According to FIG. 2, the substrate processing apparatus 110 may include a process processing unit 210, a maintenance unit 220, a gantry unit 230, and an inkjet head unit 240.

The process processing unit 210 supports the substrate G while the PT operation is performed on the substrate G. Here, the PT operation refers to printing the substrate G using a substrate processing liquid.

The process processing unit 210 may support the substrate G using a non-contact method. The process processing unit 210 may support the substrate G by levitating the substrate G in the air using, for example, air. However, the present embodiment is not limited thereto. The process processing unit 210 may support the substrate G using a contact method. The process processing unit 210 may support the substrate G using, for example, a support member having a seating surface provided thereon.

The process processing unit 210 may move the substrate G in a state, in which the substrate G is supported by using air. The process processing unit 210 may include, for example, a first stage 211 and an air hole 212.

The first stage 211 is a base, and is provided so that the substrate G can be seated thereon. The air holes 212 may be formed passing through the upper surface of the first stage 211, and a plurality of air holes 212 may be formed in a printing zone on the first stage 211.

The air hole 212 may inject air in the upper direction (the third direction 30) of the first stage 211. The air hole 212 may levitate the substrate G seated on the first stage 211 in the air through this.

Although not shown in FIG. 2, the process processing unit 210 may further include a gripper and a guide rail. When the substrate G moves in the longitudinal direction (the first direction 10) of the first stage 211, the gripper grips the substrate G to prevent substrate G being separated from the first stage 211. When the substrate G moves, the gripper may move in the same direction as the substrate G along the guide rail while gripping the substrate G. The gripper and the guide rail may be provided outside the first stage 211.

The maintenance unit 220 measures a discharge position (i.e., an impact point) of the substrate processing liquid on the substrate G, whether the substrate processing liquid is discharged, and the like. The maintenance unit 220 may measure the discharge position of the substrate processing liquid, whether the substrate processing liquid is discharged, etc. with respect to each of the plurality of nozzles provided in the inkjet head unit 240, and the obtained measurement result may be provided to the controller 130.

The maintenance unit 220 may include, for example, a second stage 221, a third guide rail 222, a first plate 223, a calibration board 224, and a vision module 225.

Like the first stage 211, the second stage 221 serves as a base and may be disposed in parallel with the first stage 211. The second stage 221 may include a maintenance zone thereon. The second stage 221 may be provided to have the same size as the first stage 211, but may be provided to have a size smaller or larger than that of the first stage 211.

The third guide rail 222 guides the movement path of the first plate 223. The third guide rail 222 may be provided on the second stage 221 as at least one line along the longitudinal direction of the second stage 221 (the first direction 10). The third guide rail 222 may be implemented as, for example, an LM guide system (Linear Motor guide system).

Although not shown in FIG. 2, the maintenance unit 220 may further include a fourth guide rail. Like the third guide rail 222, the fourth guide rail guides the movement path of the first plate 223, and may be provided on the second stage 221 as at least one line along the width direction of the second stage 221 (second direction 20).

The first plate 223 moves on the second stage 221 along the third guide rail 222 and/or the fourth guide rail. The first plate 223 may move in parallel with the substrate G along the third guide rail 222, and may approach or move away from the substrate G along the fourth guide rail.

The calibration board 224 is for measuring the discharge position of the substrate processing liquid on the substrate G. The calibration board 224 may be installed on the first plate 223 including an alignment mark, a ruler, and the like, and may be provided along the longitudinal direction of the first plate 223 (first direction 10).

The vision module 225 includes a camera module, and obtains image information on the substrate G. The image information of the substrate G obtained by the vision module 225 may include information on whether or not the substrate processing liquid is discharged, a discharge position of the substrate processing liquid, the discharge amount of the substrate processing liquid, the discharge area of the substrate processing liquid, etc. Meanwhile, the vision module 225 may obtain and provide information on the calibration board 224 as well as image information on the substrate G, on which the substrate processing liquid is discharged.

When processing the substrate G, the vision module 225 may obtain image information on the substrate G in real time. The vision module 225 may obtain image information by photographing the substrate G in the longitudinal direction (the first direction 10). In this case, the vision module 225 may include a line scan camera. Also, the vision module 225 may obtain image information by photographing the substrate G for each area of a predetermined size. In this case, the vision module 225 may include an area scan camera.

The vision module 225 may be attached to a bottom surface or a side surface of the gantry unit 230 in order to obtain image information of the substrate G, on which the substrate processing liquid is discharged. However, the present embodiment is not limited thereto. The vision module 225 may be attached to the side surface of the inkjet head unit 240. Meanwhile, at least one vision module 225 may be provided in the substrate processing apparatus 110, and may be fixedly installed or movably installed.

The gantry unit 230 supports the inkjet head unit 240. The gantry unit 230 may be provided on the first stage 211 and the second stage 221 so that the inkjet head unit 240 can discharge the substrate processing liquid onto the substrate G.

The gantry unit 230 may be provided on the first stage 211 and the second stage 221 with the width direction (the second direction 20) of the first stage 211 and the second stage 221 as the longitudinal direction. The gantry unit 230 may move along the first guide rail (270a) and the second guide rail (270b) in a longitudinal direction (first direction 10) of the first stage 211 and the second stage 221. Meanwhile, the first guide rail 270a and the second guide rail 270b may be provided outside the first stage 211 and the second stage 221 along the longitudinal direction (the first direction 10) of the first stage 211 and the second stage 221.

Meanwhile, although not shown in FIG. 2, the substrate processing apparatus 110 may further include a gantry moving unit. The gantry moving unit slidably moves the gantry unit 230 along the first guide rail 270a and the second guide rail 270b. The gantry moving unit may be installed inside the gantry unit 230.

The inkjet head unit 240 discharges the substrate processing liquid on the substrate G in the form of droplets. The inkjet head unit 240 may be installed on a side surface or a bottom surface of the gantry unit 230.

At least one inkjet head unit 240 may be installed in the gantry unit 230. When a plurality of inkjet head units 240 are installed in the gantry unit 230, the plurality of inkjet head units 240 may be disposed in a line along the longitudinal direction (second direction 20) of the gantry unit 230. In addition, the plurality of inkjet head units 240 may each operate independently, and vice versa, may operate uniformly.

The inkjet head unit 240 may move along the longitudinal direction (second direction 20) of the gantry unit 230 to be located at a desired point on the substrate G. However, the present embodiment is not limited thereto. The inkjet head unit 240 may move along the height direction (third direction 30) of the gantry unit 230, and may also rotate clockwise or counterclockwise.

Meanwhile, the inkjet head unit 240 may be installed to be fixed to the gantry unit 230. In this case, the gantry unit 230 may be provided to be movable.

Although not shown in FIG. 2, the substrate processing apparatus 110 may further include an inkjet head moving unit. The inkjet head moving unit linearly moves or rotates the inkjet head unit 240.

Although not shown in FIG. 2, the inkjet head unit 240 may include a nozzle plate, a plurality of nozzles, a piezoelectric element, and the like. The nozzle plate constitutes the body of the inkjet head unit 240. A plurality of (e.g., 128, 256, etc.) nozzles may be provided in multiple rows and columns at regular intervals under the nozzle plate, and the piezoelectric element may be provided in the nozzle plate as many as the number corresponding to the number of nozzles. When the inkjet head unit 240 is configured as described above, the substrate processing liquid may be discharged onto the substrate G through the nozzle according to the operation of the piezoelectric element.

Meanwhile, the inkjet head unit 240 may independently control the discharge amount of the substrate processing liquid provided through each nozzle according to a voltage applied to the piezoelectric element.

Hereinafter, it will be described with reference to FIGS. 1 and 2.

The substrate processing liquid providing apparatus 120 is a reservoir that provides a substrate processing liquid (e.g., ink) to the inkjet head unit 240 of the substrate processing apparatus 110. The substrate processing liquid providing apparatus 120 may be installed in the gantry unit 230 of the substrate processing apparatus 110 as shown in FIG. 2, and may include a storage tank 310 and a pressure control module 320.

The storage tank 310 stores the substrate processing liquid, and the pressure control module 320 controls the internal pressure of the storage tank 310. The storage tank 310 may supply an appropriate amount of the substrate processing liquid to the inkjet head unit 240 based on the pressure provided by the pressure control module 320.

The controller 130 controls the entire operation of each unit constituting the substrate processing apparatus 110 and the substrate processing liquid providing apparatus 120. The controller 130 may control the operation of, for example, the air hole 212 and the gripper of the process processing unit 210, the vision module 225 of the maintenance unit 220, the gantry unit 230, the inkjet head unit 240, and the pressure control module 320 of the substrate processing liquid providing apparatus 120.

The controller 130 may be implemented by a computer or a server, including a process controller, a control program, an input module, an output module (or a display module), a memory module, and the like. In the above, the process controller may include a microprocessor that executes a control function for each component constituting the substrate processing apparatus 110, and the control program may execute various processing of the substrate processing apparatus 110 according to the control of the process controller. The memory module stores programs for executing various processing of the substrate processing apparatus 110 according to various data and processing conditions, that is, processing recipes.

Meanwhile, the controller 130 may also serve to perform maintenance on the inkjet head unit 240. The controller 130 may, for example, correct the discharge position of the substrate processing liquid of each nozzle provided in the inkjet head unit 240 based on the measurement result of the maintenance unit 220, or detect a defective nozzle (that is, a nozzle that does not discharge the substrate processing liquid) among a plurality of nozzles and perform a cleaning operation on the defective nozzle.

As described above, in the case of the substrate processing apparatus 110 that processes the substrate G using the inkjet head unit 240, it may have a circulating structure for circulating the substrate processing liquid to prevent the substrate processing liquid from being defectively deposited on the substrate G. In this case, the substrate processing liquid providing apparatus 120 interworking with the substrate processing apparatus 110 may have a structure including a dead zone inside in order to prevent the substrate processing liquid from sloshing therein according to the movement of the inkjet head unit 240.

Figure 3:
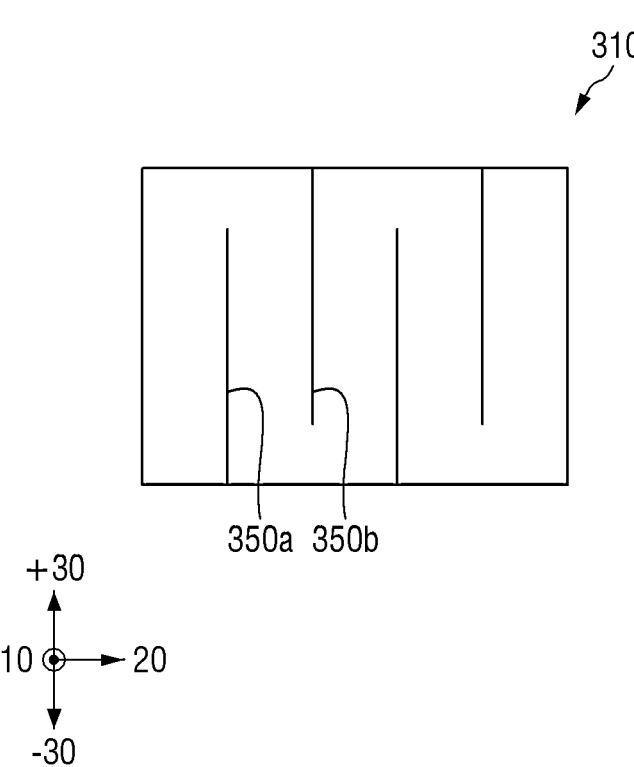
FIG. 3 is an exemplary diagram schematically illustrating an internal structure of a storage tank constituting an apparatus for providing a substrate processing liquid.

When the substrate processing liquid providing apparatus 120 has a structure for preventing internal sloshing, a plurality of partition walls 350a and 350b that are cross-installed in the vertical direction (third direction 30) inside the storage tank 310 may be included as shown in FIG. 3.

Here, the first partition wall 350a may be installed elongated in the downward direction (negative third direction (−30)) from the inner upper end of the storage tank 310, and the second partition wall 350b may be installed elongated in the upward direction (positive third direction (+30)) from the inner lower end of the storage tank 310. At least one of the first partition wall 350a and the second partition wall 350b may be installed inside the storage tank 310, and they may be disposed in one direction (first direction 10 or second direction 20) in a zigzag form inside the storage tank 310. FIG. 3 is an exemplary diagram schematically illustrating an internal structure of a storage tank constituting a substrate processing liquid providing apparatus.

When the plurality of partition walls 350a and 350b are cross-installed in the storage tank 310 as described above, the substrate processing liquid providing apparatus 120 may have a structure capable of sufficiently suppressing the supply and sloshing of the substrate processing liquid. However, such a structure of the substrate processing liquid providing apparatus 120 may cause a problem of lowering the fluidity of the substrate processing liquid in terms of internal agitation.

In addition, due to the variability of the ink used to process the substrate G in recent years, a large number of particles are included in the ink. However, when the substrate processing liquid contains a large number of particles as described above, many problems such as aggregation between particles, sedimentation, floating, and phase separation may be caused.

Therefore, in order to solve this problem, the present invention provides a substrate processing liquid providing apparatus 120 having a structure capable of preventing sloshing while facilitating agitation fluidity in the storage tank 310 of the substrate processing liquid. In particular, the present invention provides an apparatus for providing a substrate processing liquid 120 having an optimal structure in the correlation between securing internal agitation fluidity and recovery of sloshing.

Hereinafter, the structure of the substrate processing liquid providing apparatus 120 provided in the present invention will be described in detail.

Figure 4:
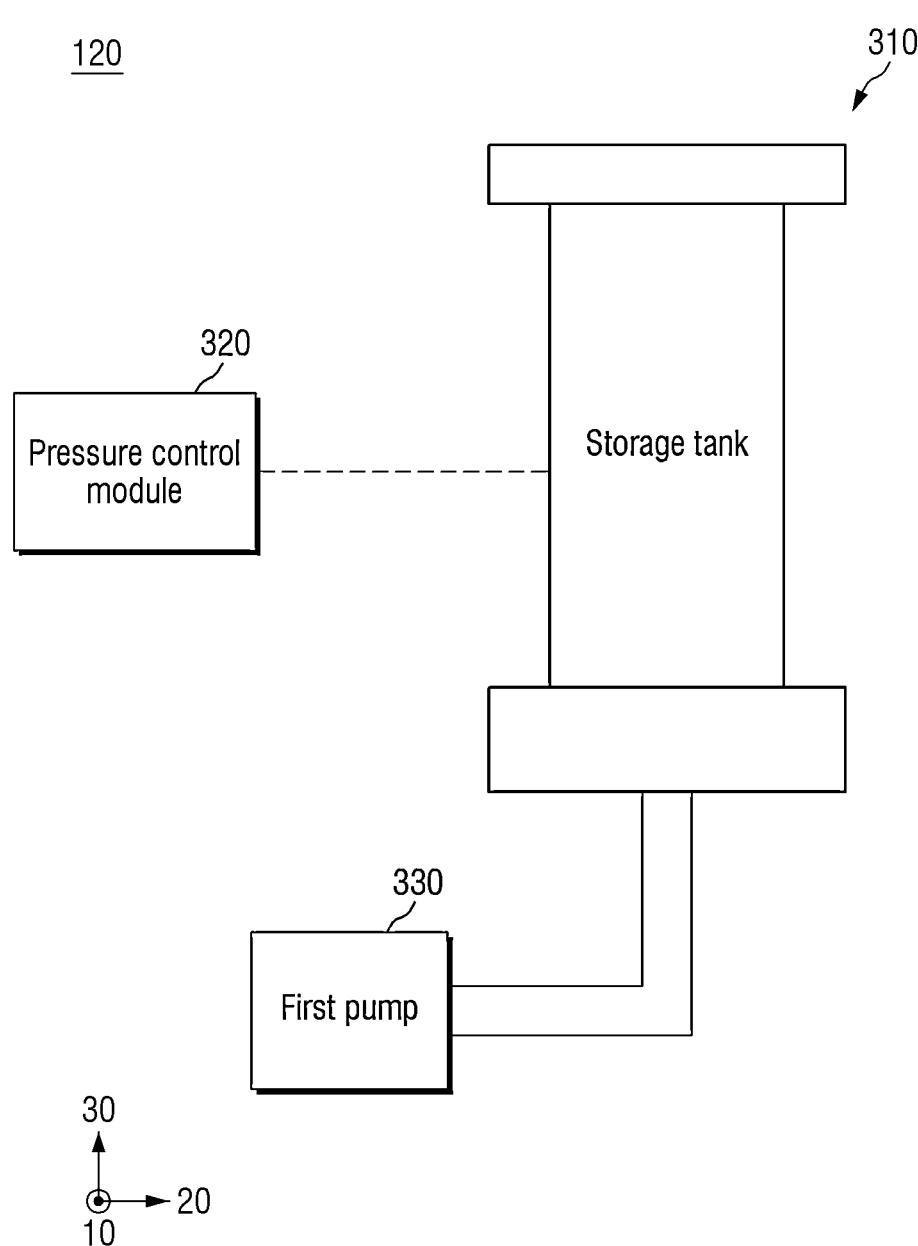
FIG. 4 is a first exemplary diagram schematically illustrating an internal structure of a substrate processing liquid providing apparatus constituting a substrate processing system according to an embodiment of the present invention.

FIG. 4 is a first exemplary diagram schematically illustrating an internal structure of a substrate processing liquid providing apparatus constituting a substrate processing system according to an embodiment of the present invention. Referring to FIG. 4, the substrate processing liquid providing apparatus 120 may include a storage tank 310, a pressure control module 320, and a first pump 330.

The storage tank 310 and the pressure control module 320 have been described above with reference to FIG. 2, and a detailed description thereof will be omitted herein.

The first pump 330 serves as pumping to agitate the substrate processing liquid stored in the storage tank 310. The apparatus 120 for providing a substrate processing liquid may secure agitation fluidity with respect to the substrate processing liquid stored in the storage tank 310 according to this action of the first pump 330.

The substrate processing liquid providing apparatus 120 may be configured as an integrated module with the inkjet head unit 240. Accordingly, in the present embodiment, when the inkjet head unit 240 moves on the gantry unit 230, the substrate processing liquid providing apparatus 120 may also move. However, the present embodiment is not limited thereto. The substrate processing liquid providing apparatus 120 may be configured as a separate type from the inkjet head unit 240.

When the substrate processing liquid providing apparatus 120 and the inkjet head unit 240 are configured as an integrated module, the storage tank 310 may be disposed at a higher level than the inkjet head unit 240. The storage tank 310, the first pump 330, and the inkjet head unit 240 may be disposed on the front surface of the gantry unit 230, and depending on the length of a pipe connecting the storage tank 310 and the inkjet head unit 240, the storage tank 310 and the first pump 330 may be separately disposed on the front and rear surfaces of the inkjet head unit 240 and the gantry unit 230.

As described above, the substrate processing liquid used by the substrate processing apparatus 110 for processing the substrate G may be an ink. Such an ink for a display device used for manufacturing a display device may include an organic material, an inorganic material, a metal material, and the like, and may be prepared by forming the material with a solvent or a solute and converting the material into an ink.

The ink for a display device may include a plurality of particles. Here, the plurality of particles may have a nano size, a micro size, or a macro size. However, in the case of such a particle-dispersed ink, sedimentation of particles may occur over time, which may cause sedimentation of the particles to the lower portion of the storage tank 310 and imbalance of particle distribution.

Therefore, in the present embodiment, the substrate processing liquid providing apparatus 120 may have an internal circulation agitating system so that the distribution of particles in the ink may be uniformly maintained. That is, the substrate processing liquid providing apparatus 120 may include a first pump 330 capable of agitating the substrate processing liquid in the storage tank 310 through a pumping force.

The first pump 330 may provide a pumping force into the storage tank 310 while the substrate processing liquid providing apparatus 120 provides the substrate processing liquid to the substrate processing apparatus 110. However, the present embodiment is not limited thereto. The first pump 330 is also possible to continuously provide a pumping force to the inside of the storage tank 310 not only while the substrate processing liquid providing apparatus 120 provides the substrate processing liquid to the substrate processing apparatus 110, but also while the substrate processing liquid providing apparatus 120 does not provide the substrate processing liquid to the substrate processing apparatus 110.

Figure 5:
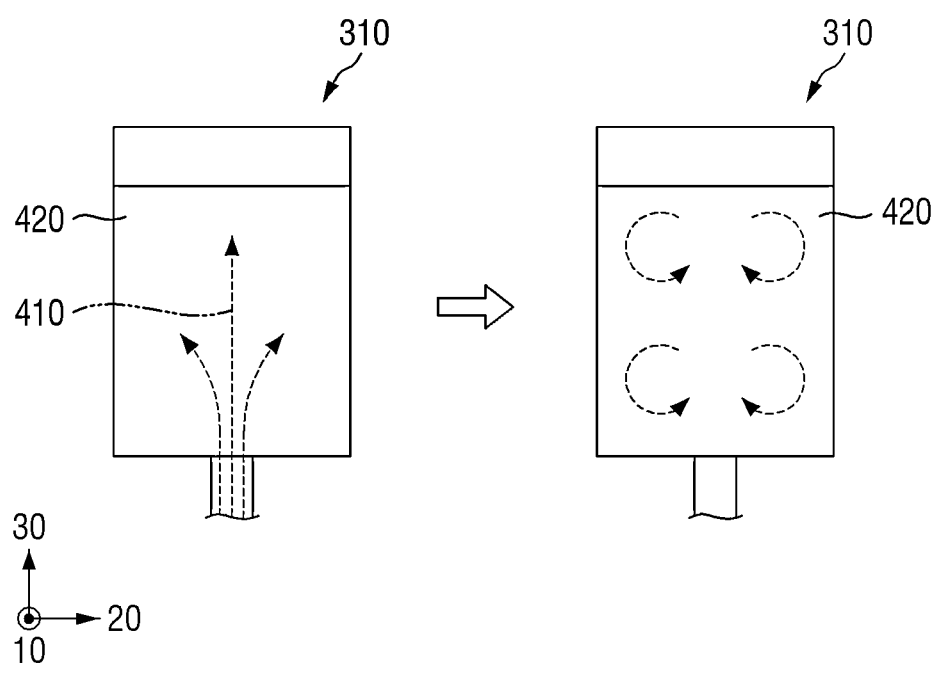
FIG. 5 is a reference diagram for describing an effect of a case, in which the apparatus for providing a substrate processing liquid has the internal structure according to the first example.

The first pump 330 may be connected to the lower end of the storage tank 310 to provide a pumping force to the inside of the storage tank 310. When the first pump 330 is installed in this way, as shown in FIG. 5, it is possible to deliver the pumping force 410 from the inner bottom surface of the storage tank 310 in the upward direction, and according to the pumping force 410, the effect of smoothly agitating and flowing the substrate processing liquid 420 may be obtained. FIG. 5 is a reference diagram for describing an effect of a case, in which the apparatus for providing a substrate treatment liquid has the internal structure according to the first example.

Figure 6:
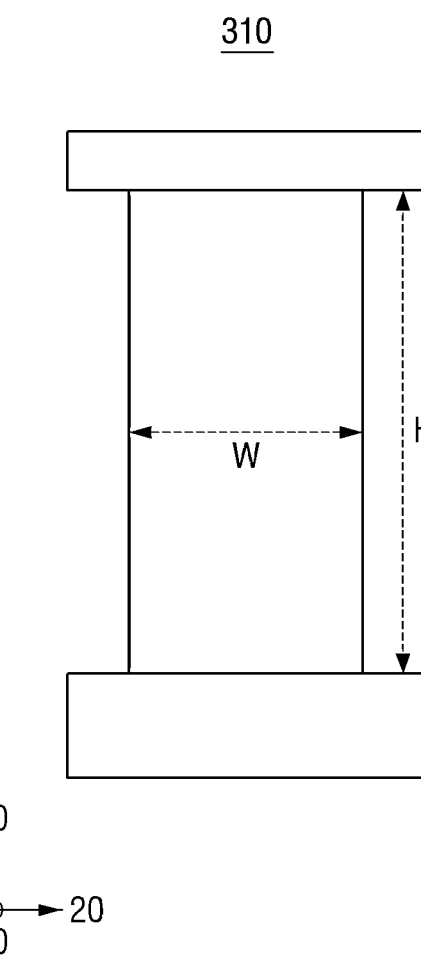
FIG. 6 is a first exemplary diagram schematically illustrating an internal structure of a storage tank constituting an apparatus for providing a substrate processing liquid.

The first pump 330 may be connected to the side of the storage tank 310 to provide a pumping force into the interior of the storage tank 310. When the substrate processing liquid providing apparatus 120 is installed in the substrate processing apparatus 110, the substrate processing liquid providing apparatus 120 may be installed to be attached to a side surface of the gantry unit 230. When the substrate processing liquid providing apparatus 120 is installed in this way, the storage tank 310 may be formed to have a large value in the longitudinal direction (the third direction 30) rather than the width direction (first direction 10 or second direction 20) as shown in FIG. 6. That is, the height H of the storage tank 310 may have a greater value than the width W of the storage tank 310 (H>W).

In this embodiment, the storage tank 310 may have a rectangular parallelepiped shape as shown in FIG. 6. However, the present embodiment is not limited thereto. The storage tank 310 may have a column shape, such as a cylinder, a polygonal column, or have a cone shape, such as a cone, a triangular pyramid, or have a spherical shape. FIG. 6 is a first exemplary diagram schematically illustrating an internal structure of a storage tank constituting an apparatus for providing a substrate processing liquid.

Figure 7:
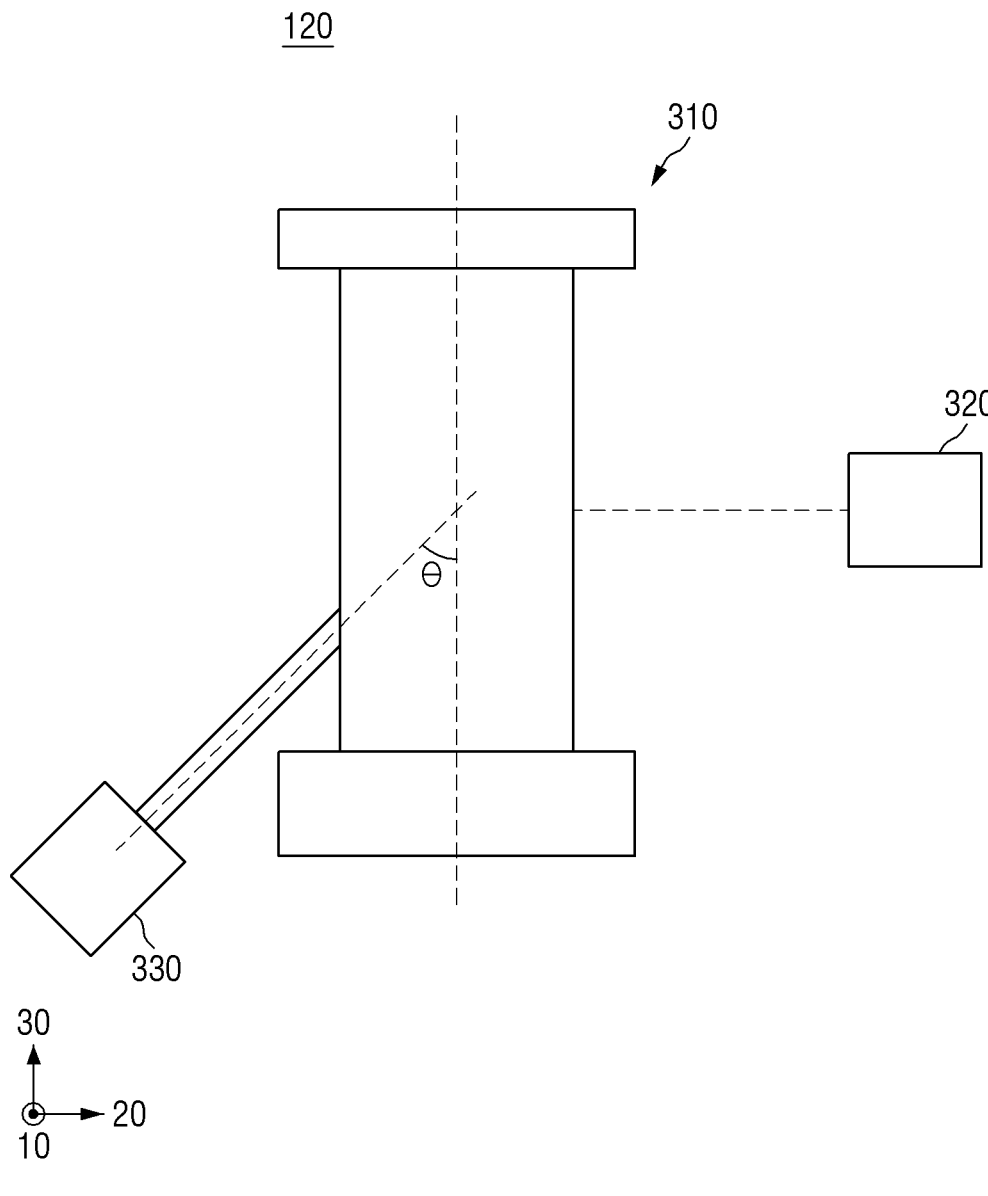
FIG. 7 is a second exemplary diagram schematically illustrating an internal structure of a substrate processing liquid providing apparatus constituting a substrate processing system according to an embodiment of the present invention.
Figure 8:
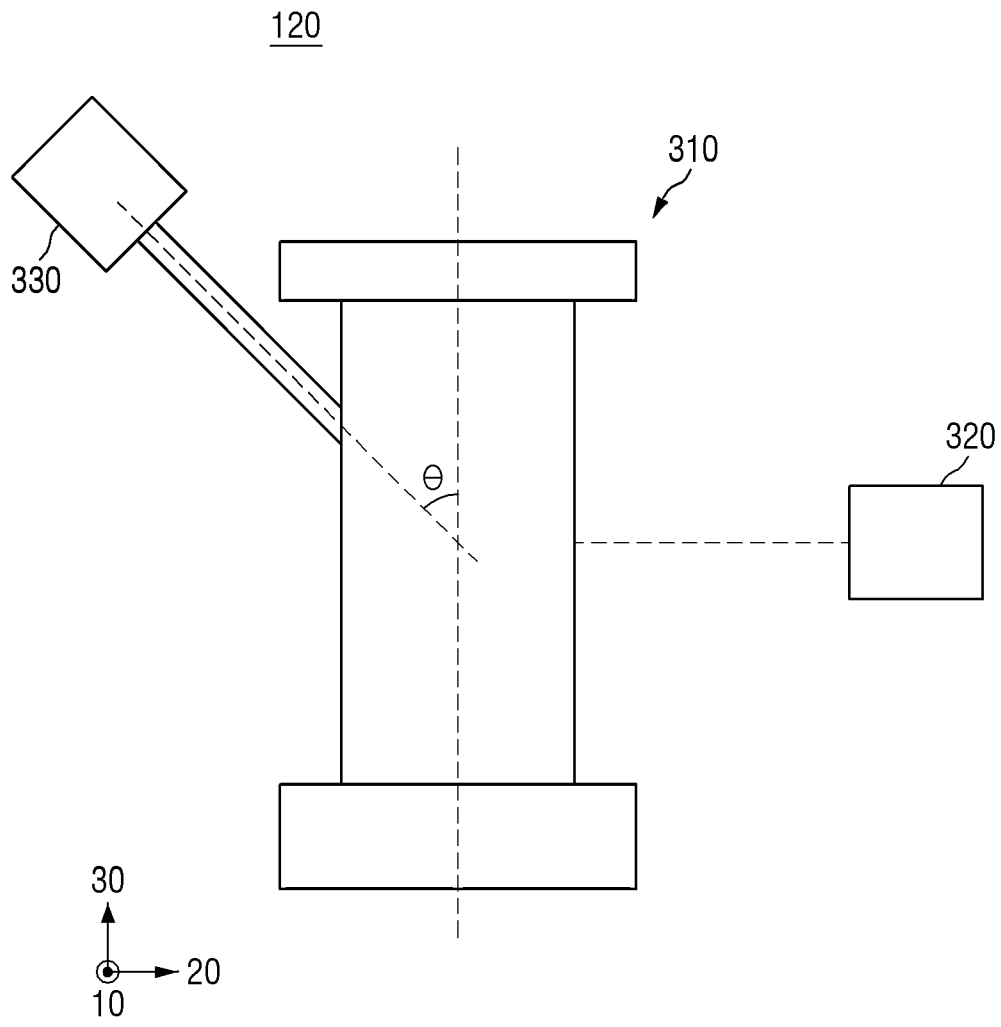
FIG. 8 is a third exemplary diagram schematically illustrating an internal structure of a substrate processing liquid providing apparatus constituting a substrate processing system according to an embodiment of the present invention.

When the storage tank 310 has the above structure, the first pump 330 may be inclinedly connected to the side surface of the storage tank 310 to increase the agitating fluidity of the substrate processing liquid (0°<θ<90°). In this case, the first pump 330 may be connected to be inclined in the upward direction as shown in FIG. 7, and may be connected to be inclined in the downward direction as shown in FIG. 8. FIG. 7 is a second exemplary diagram schematically illustrating an internal structure of an apparatus for providing a substrate processing liquid constituting a substrate processing system according to an embodiment of the present invention, and FIG. 8 is a third exemplary diagram schematically illustrating an internal structure of a substrate processing liquid providing apparatus constituting the substrate processing system according to an embodiment of the present invention.

On the other hand, it is also possible that the first pump 330 is connected to the upper end of the storage tank 310, and provides a pumping force in the downward direction from the inner upper surface of the storage tank 310.

The first pump 330 may be provided as a magnetic pump for self-circulation and agitation of the substrate processing liquid in the storage tank 310. For example, the first pump 330 may be provided as a magnetic levitation pump that operates in a magnetically levitated manner. When the first pump 330 is provided in this way, the substrate processing liquid providing apparatus 120 may obtain an effect of resolving problems such as physical breakage of the impeller agitator or the magnetic agitator fixed to the drive shaft. However, the present embodiment is not limited thereto. The first pump 330 may be provided as a pump operating in a different manner other than the magnetic levitation type magnetic pump. For example, the first pump 330 may be provided as a hydraulic pump capable of converting mechanical energy into pressure energy and applying it.

The substrate processing liquid providing apparatus 120 may include a plurality of pumps. Here, the plurality of pumps may perform the same function (for example, may serve to agitate the substrate processing liquid, such as the first pump 330), but may also perform different functions. Hereinafter, a case in which a plurality of pumps perform different functions, will be described.

Figure 9:
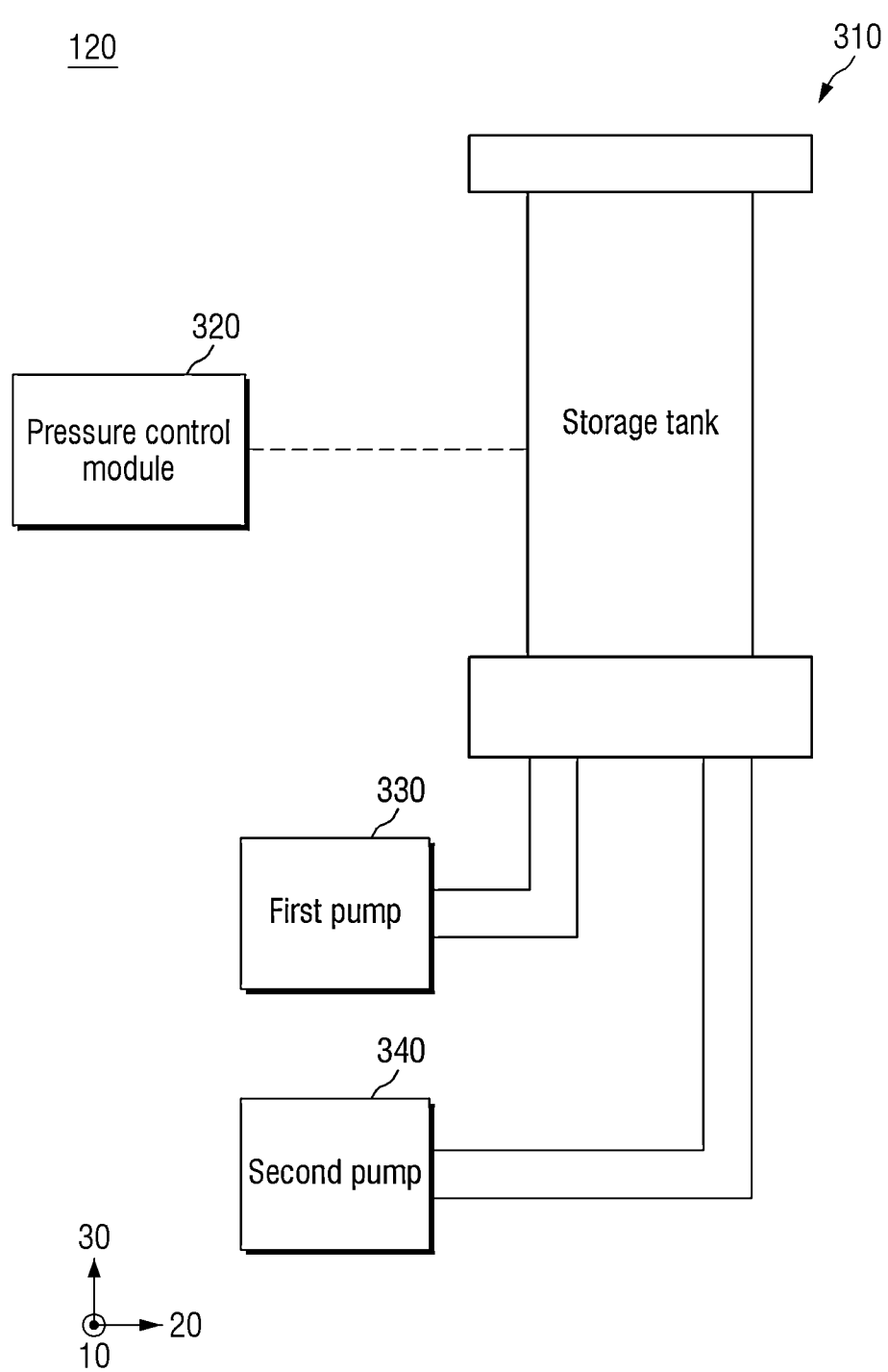
FIG. 9 is a fourth exemplary diagram schematically illustrating an internal structure of a substrate processing liquid providing apparatus constituting a substrate processing system according to an embodiment of the present invention.

FIG. 9 is a fourth exemplary diagram schematically illustrating an internal structure of a substrate processing liquid providing apparatus constituting a substrate processing system according to an embodiment of the present invention. Referring to FIG. 9, the substrate processing liquid providing apparatus 120 may include a storage tank 310, a pressure control module 320, a first pump 330, and a second pump 340.

The storage tank 310 and the pressure control module 320 have been described with reference to FIG. 2 above, and the first pump 330 has been described with reference to FIGS. 4 to 8 above, and detailed descriptions thereof are omitted here.

Figure 10:
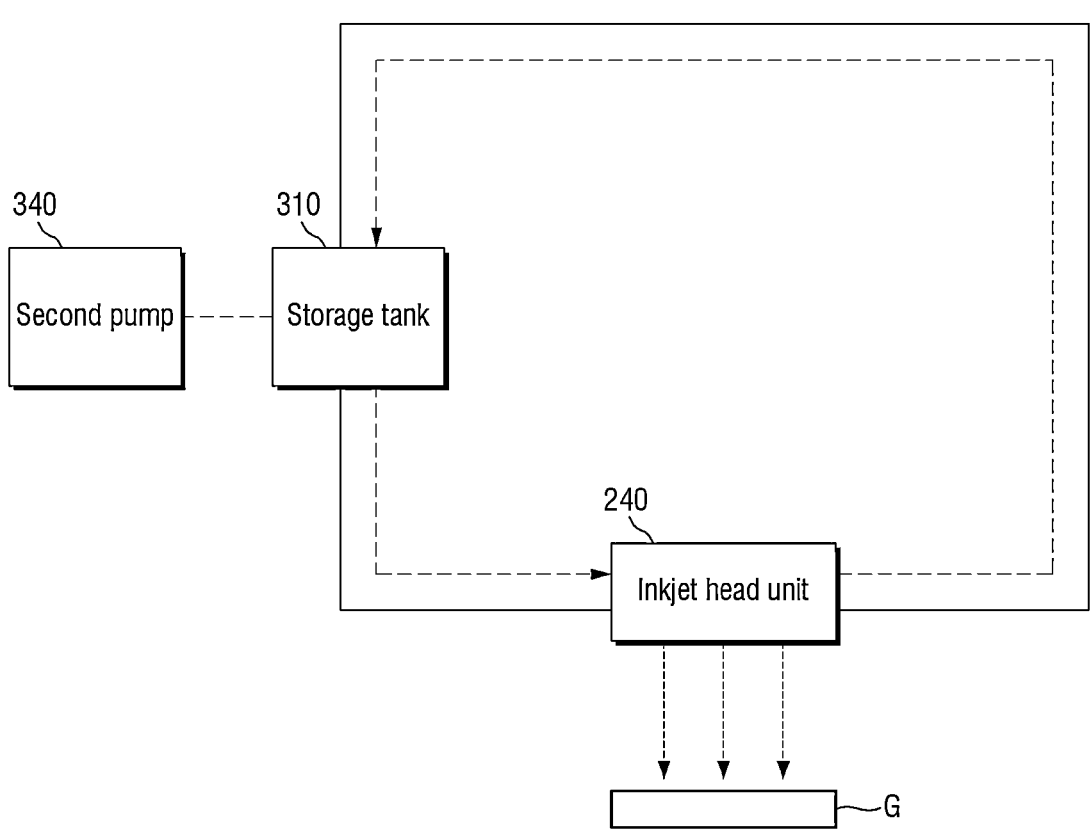
FIG. 10 is a reference diagram for describing a role of a second pump constituting an apparatus for providing a substrate processing liquid.

The second pump 340 serves as pumping to circulate the substrate processing liquid between the storage tank 310 and the inkjet head unit 240. The substrate processing liquid stored in the storage tank 310 moves to the inkjet head unit 240 under the control of the second pump 340 as shown in FIG. 10, and the inkjet head unit 240 discharge the substrate processing liquid onto the substrate G so that the substrate G is processed. In this case, a portion of the substrate processing liquid may remain without being discharged onto the substrate G through the inkjet head unit 240, and the remaining substrate processing liquid may move to the storage tank 310 again under the control of the second pump 340. Accordingly, the second pump 340 may serve to circulate the substrate processing liquid between the storage tank 310 and the inkjet head unit 240 through the above operation. FIG. 10 is a reference diagram for describing a role of a second pump constituting an apparatus for providing a substrate processing liquid.

The second pump 340 may be connected to one surface of the storage tank 310 to circulate the substrate processing liquid. In this case, the first pump 330 and the second pump 340 may be respectively connected to the same surface of the storage tank 310, but may be respectively connected to different surfaces of the storage tank 310. The example of FIG. 9 is an example, in which the first pump 330 and the second pump 340 are respectively connected to the same surface of the storage tank 310, that is, to the lower end of the storage tank 310.

The second pump 340 may provide a pressure greater than that of the first pump 330 to the storage tank 310 to circulate the substrate processing liquid between the storage tank 310 and the inkjet head unit 240. Also, the second pump 340 may be disposed below the first pump 330. The pressure values provided by the first pump 330 and the second pump 340 or the arrangement structure between the first pump 330 and the second pump 340 are not necessarily limited to the above in this embodiment, and they may be variously modified according to the shape, size, structure, etc. of the substrate processing liquid providing apparatus 120.

In the facility in the head-reservoir module concept (that is, the inkjet facility using the substrate processing liquid providing apparatus 120 and the inkjet head unit 240 as in the case of the present invention), sloshing inside the reservoir occurs when the head shaft moves. At this time, if a partition wall structure is applied to the inside of the reservoir to prevent sloshing, the degree of sloshing can be reduced by dividing the internal volume, and the sloshing recovery time can be shortened.

However, such a sloshing suppressing and recovery structure is also a factor that interferes with the agitation fluidity inside the reservoir. The present invention is characterized in that it provides a partition wall structure capable of optimizing two elements in a trade-off relationship to suppress sloshing without disturbing agitation fluidity, and to shorten sloshing recovery time.

Figure 11:
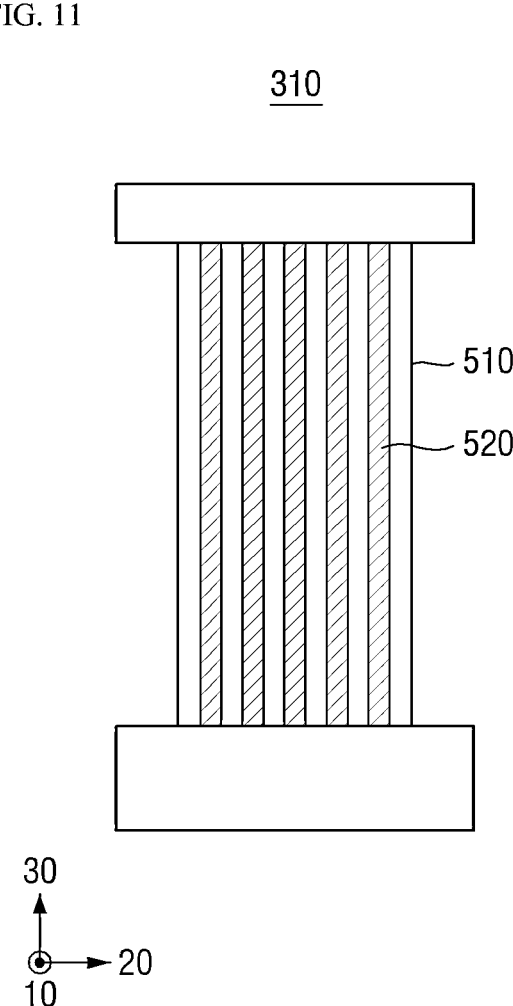
FIG. 11 is a second exemplary diagram schematically illustrating an internal structure of a storage tank constituting an apparatus for providing a substrate processing liquid.

FIG. 11 is a second exemplary diagram schematically illustrating an internal structure of a storage tank constituting an apparatus for providing a substrate processing liquid. According to FIG. 11, the storage tank 310 may include a housing 510 and a plurality of partition walls 520 installed therein.

The housing 510 constitutes the body of the storage tank 310, and an empty space is formed therein, and the substrate processing liquid may be stored in the space. The housing 510 may have a rectangular parallelepiped shape as described above, and may have a column shape such as a cylinder or a polygonal column, a cone shape such as a cone or a triangular pyramid, or a spherical shape.

The partition wall 520 may serve to divide the internal space of the housing 510. A single or a plurality of partition walls 520 may be disposed in the internal space of the housing 510, and one end of the partition wall 520 may be installed by being coupled to the cover of the housing 510. When the plurality of partition walls 520 are disposed in the inner space of the housing 510, the plurality of partition walls 520 may be disposed at a predetermined interval (e.g., 1 mm to 5 mm), and may be disposed at equal intervals.

Figure 12:
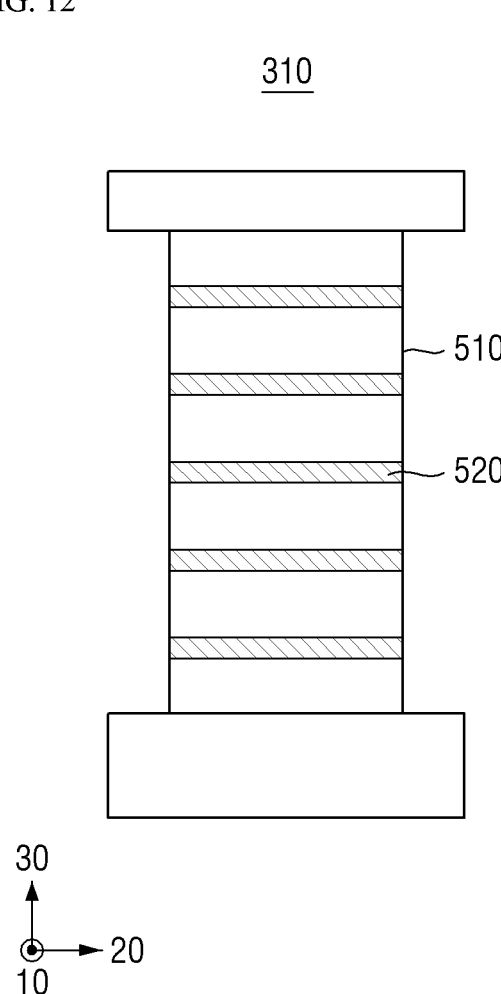
FIG. 12 is a third exemplary diagram schematically illustrating an internal structure of a storage tank constituting an apparatus for providing a substrate processing liquid.
Figure 13:
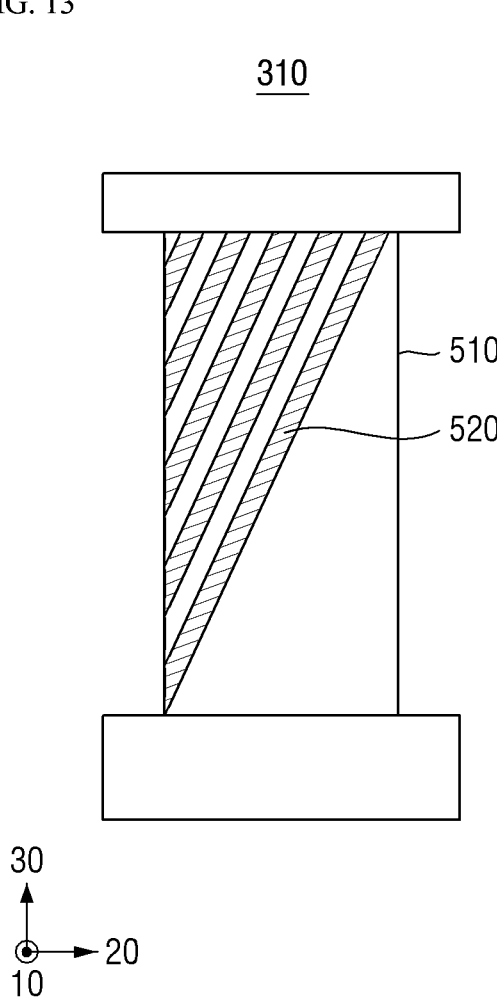
FIG. 13 is a fourth exemplary view schematically illustrating an internal structure of a storage tank constituting an apparatus for providing a substrate processing liquid.
Figure 14:
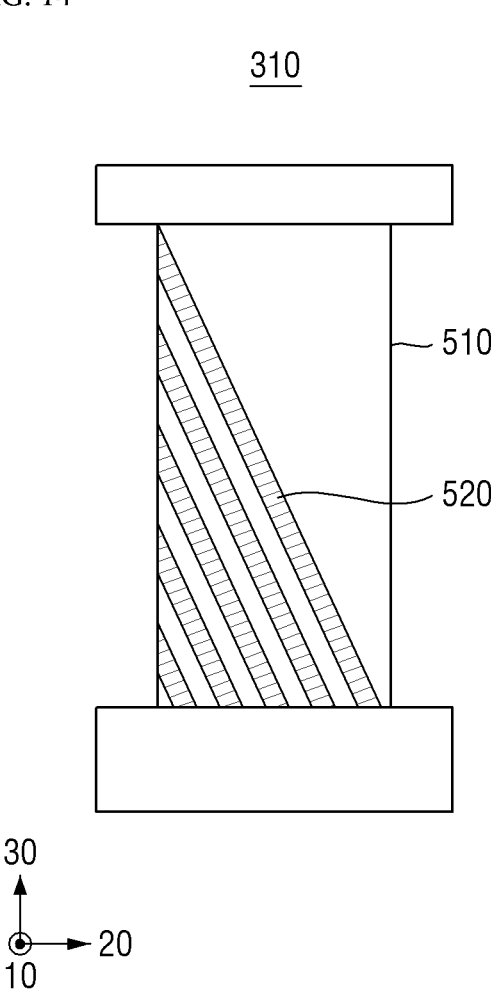
FIG. 14 is a fifth exemplary view schematically illustrating an internal structure of a storage tank constituting an apparatus for providing a substrate processing liquid.

The partition wall 520 may be elongated to be in contact with the inner end and the other end of the housing 510, respectively. For example, the partition wall 520 may be formed to be in contact with an inner upper end and a lower end of the housing 510, respectively, as shown in FIG. 11. However, the present embodiment is not limited thereto. The partition wall 520 may be formed to be in contact with both sides of the housing 510 as shown in FIG. 12, and may be formed to be in contact with the inner upper end and the side surface of the housing 510, respectively, as shown in FIG. 13. Alternatively, as shown in FIG. 14, the partition wall 520 may be formed to be in contact with the inner lower end and the side surface of the housing 510, respectively. FIG. 12 is a third exemplary view schematically illustrating an internal structure of a storage tank constituting an apparatus for providing a substrate processing liquid, and FIG. 13 is a fourth exemplary diagram schematically illustrating an internal structure of a storage tank constituting an apparatus for providing a substrate processing liquid, and FIG. 14 is a fifth exemplary view schematically illustrating an internal structure of a storage tank constituting an apparatus for providing a substrate processing liquid.

On the other hand, the partition wall 520 may be formed in contact with the inner end of the housing 510 and not in contact with the other end, and for example, the plurality of partition walls 520 may be disposed inside the housing 510 in a zigzag shape as shown in FIG. 3.

Figure 15:
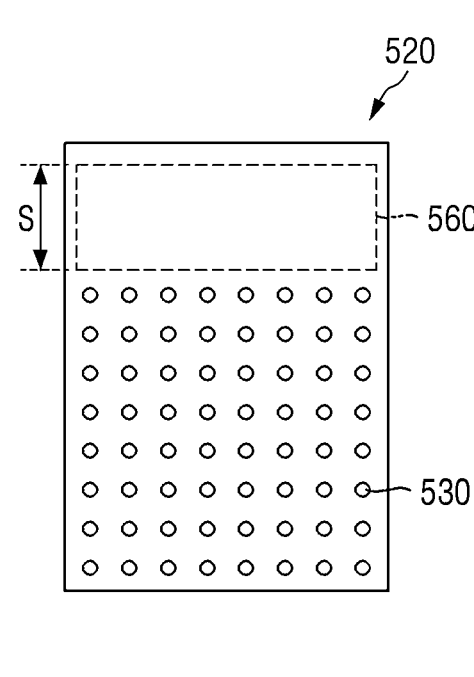
FIG. 15 is a first exemplary view for describing a structure of a partition wall installed in a storage tank constituting an apparatus for providing a substrate processing liquid.

A plurality of perforated holes 530 may be formed in the partition wall 520 in consideration of the flow and agitation of the substrate processing liquid in the housing 510. The perforated hole 530 may be formed in a portion of the partition wall 520 as shown in FIG. 15, but may also be formed over the entire surface of the partition wall 520. FIG. 15 is a first exemplary view for describing a structure of a partition wall installed in a storage tank constituting an apparatus for providing a substrate processing liquid.

In the present embodiment, the substrate processing liquid providing apparatus 120 may include a perforated partition wall structure inside the storage tank 310 to remove bubbles inflowing from the inkjet head unit 240 while preventing sloshing. The perforated partition wall structure may be formed by arranging holes or slit types having a predetermined size (e.g., 0.5 to 2 mm) at regular intervals. In the above, the hole may have a circular or regular polygonal shape, and the slit may have an elliptical or right polygonal shape. The slit may be provided through an oval hole or a rectangular hole.

Figure 16:
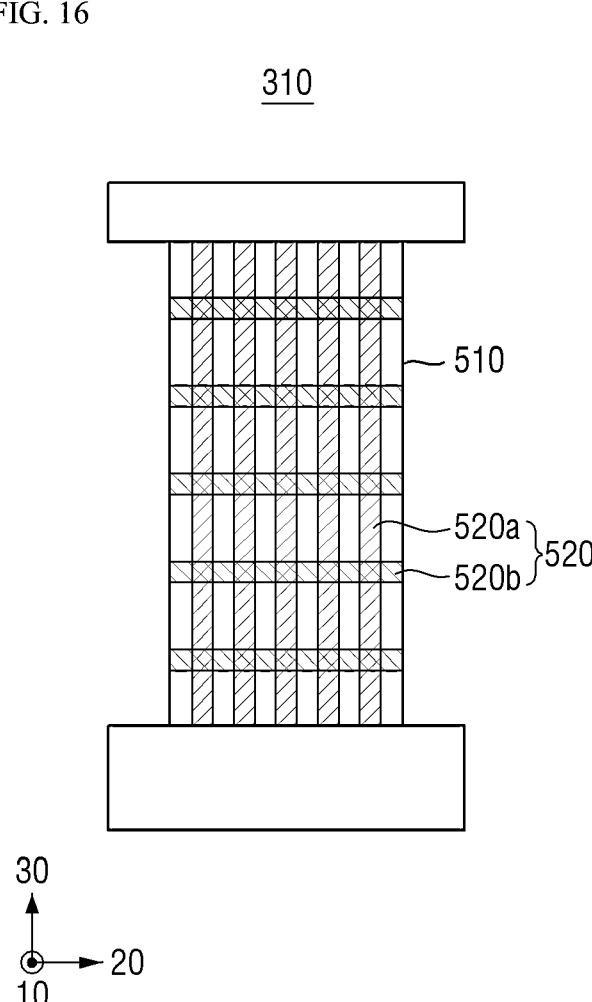
FIG. 16 is a sixth exemplary view schematically illustrating an internal structure of a storage tank constituting an apparatus for providing a substrate processing liquid.
Figure 17:
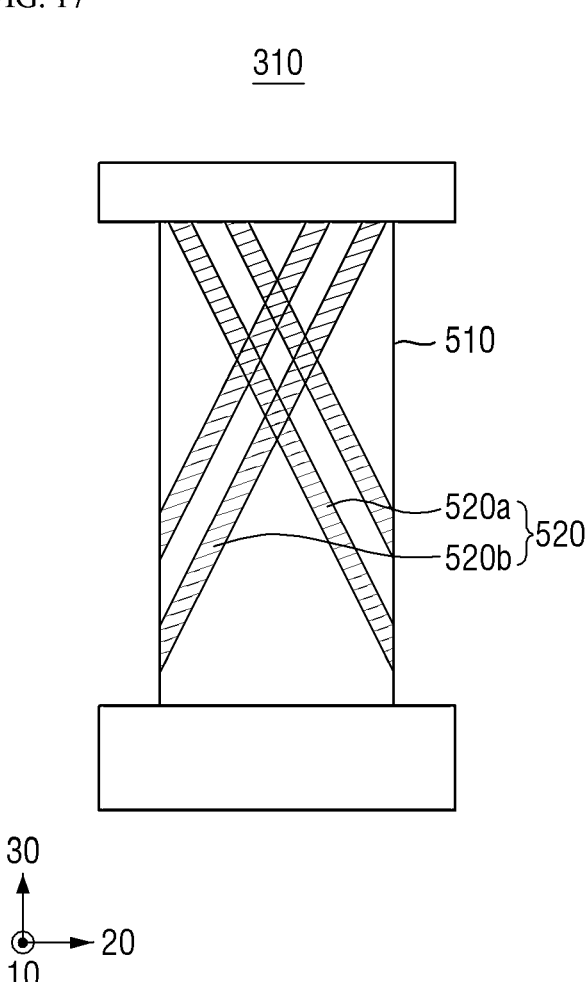
FIG. 17 is a seventh exemplary view schematically illustrating an internal structure of a storage tank constituting an apparatus for providing a substrate processing liquid.

As for the perforated partition wall structure, various structures such as a single type, a cross type, and a composite type may be applied according to the shape of the storage tank 310. Here, the cross type refers to a case, in which at least two single types among the single types described with reference to FIGS. 11 to 14 are mixed, and for example, the partition walls 520a and 520b are disposed to cross each other as shown in FIGS. 16 and 17. In addition, the composite type refers to a case, in which a single type and a cross type are mixed, and some of the plurality of partition walls 520 are provided as a cross type, and the others are provided as a single type. Meanwhile, even if at least two of the single types described with reference to FIGS. 11 to 14 are mixed, the plurality of partition walls 520 may be formed so as not to cross each other. FIG. 16 is a sixth exemplary view schematically illustrating an internal structure of a storage tank constituting an apparatus for providing a substrate processing liquid, and FIG. 17 is a seventh view schematically illustrating an internal structure of a storage tank constituting an apparatus for providing a substrate processing liquid.

Meanwhile, the material of the perforated partition wall structure may be diversified depending on the ink, such as metal, Teflon resin, or the like.

The perforated partition wall structure can apply optimal conditions in the conditions of sloshing prevention and recovery speed-circulation agitation, which are in a trade-off relationship with each other. The size of the partition wall 520, in which the perforated hole 530 is formed, may vary depending on the inner diameter or the size of area of the storage tank 310, and the height of the partition wall 520 may be determined between the inlet and the outlet. In the above, the inlet refers to a portion, in which the substrate processing liquid circulated between the storage tank 310 and the inkjet head unit 240 inflows into the storage tank 310, that is, the reservoir self-circulating inlet tube, and the outlet refers to a portion, in which the substrate processing liquid is discharged from the storage tank 310, that is, the lower circulation outlet tube.

Figure 18:
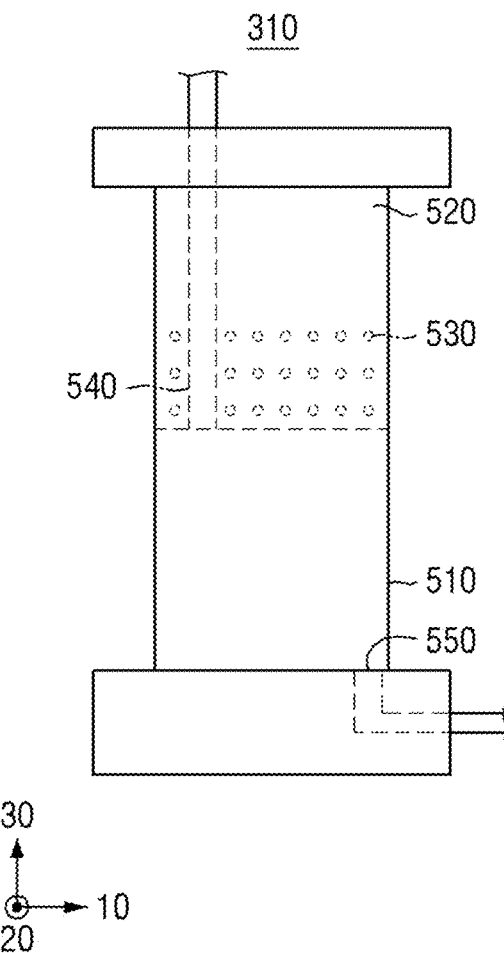
FIG. 18 is a second exemplary view for describing a structure of a partition wall installed in a storage tank constituting an apparatus for providing a substrate processing liquid.
Figure 19:
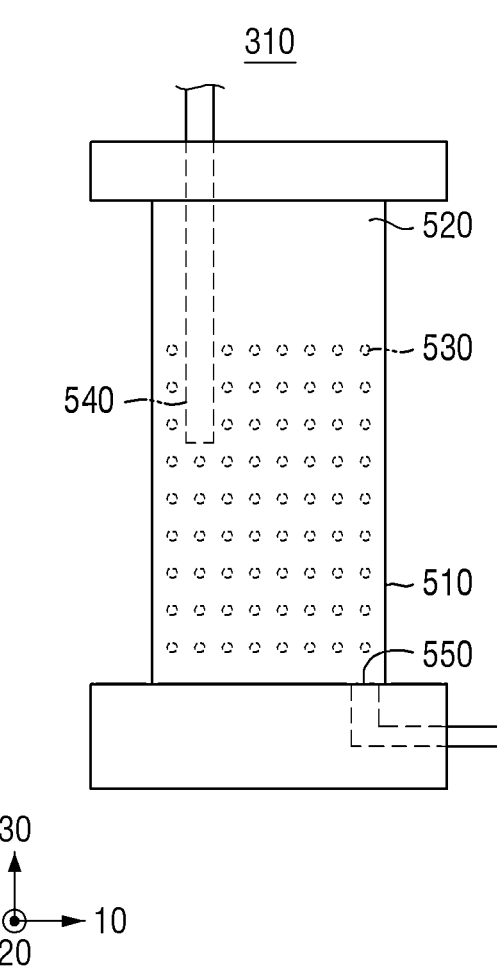
FIG. 19 is a third exemplary view for describing a structure of a partition wall installed in a storage tank constituting an apparatus for providing a substrate processing liquid.
Figure 20:
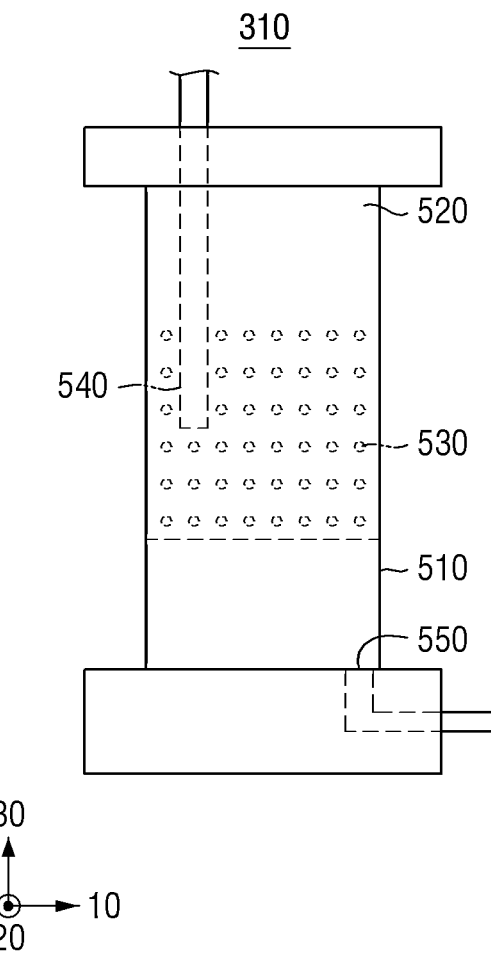
FIG. 20 is a fourth exemplary view for describing a structure of a partition wall installed in a storage tank constituting an apparatus for providing a substrate processing liquid.

For example, the partition wall 520, in which the perforated hole 530 is formed, may be formed from the inner upper end of the storage tank 310 to the portion where the inlet 540 is located, as shown in FIG. 18, and it may be formed from the inner upper end of the storage tank 310 to the portion where the outlet 550 is located as shown in FIG. 19. Alternatively, the partition wall 520, in which the perforated hole 530 is formed, may be formed up to a portion between the inlet 540 and the outlet 550 as shown in FIG. 20. FIG. 18 is a second exemplary view for describing a structure of a partition wall installed in a storage tank constituting an apparatus for providing substrate processing liquid. FIG. 19 is a third exemplary view for describing the structure of the partition wall installed in the storage tank constituting the substrate processing liquid providing apparatus. FIG. 20 is a fourth exemplary view for describing a structure of a partition wall installed in a storage tank constituting an apparatus for providing a substrate processing liquid.

Figure 21:
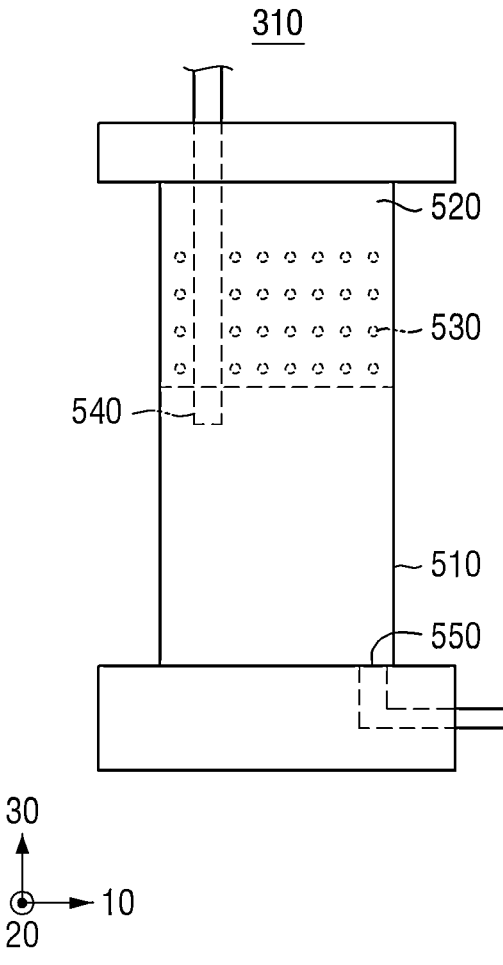
FIG. 21 is a fifth exemplary view for describing a structure of a partition wall installed in a storage tank constituting an apparatus for providing a substrate processing liquid.

On the other hand, the height of the partition wall 520 is not determined between the inlet 540 and the outlet 550, but may be determined from the lower head supply tube side. For example, the partition wall 520, in which the perforated hole 530 is formed, may be formed to be higher than a portion, in which the inlet 540 is located at the inner upper end of the storage tank 310 as shown in FIG. 21. FIG. 21 is a fifth exemplary view for describing a structure of a partition wall installed in a storage tank constituting an apparatus for providing a substrate processing liquid.

As described above, a plurality of perforated holes 530 may be formed in the partition wall 520, and as shown in FIG. 15, the perforated hole 530 may be formed in a portion of the partition wall 520 with a margin region 560 of a predetermined size. Here, the size S of the margin region 560, in which the perforated hole 530 is not formed, may vary depending on the amount of the substrate processing liquid to be filled in the storage tank 310. That is, when the substrate processing liquid fills the internal space of the storage tank 310 by about 50%, the perforated hole 530 may be formed up to a level of 50% in the height direction 30 from the lower end of the partition wall 520, and when the substrate processing liquid fills the internal space of the storage tank 310 by about 80%, the perforated hole 530 may be formed up to a level of 80% in the height direction 30 from the lower end of the partition wall 520.

It is also possible that the perforated hole 530 is formed in the entire partition wall 520, regardless of the amount of the substrate processing liquid to be filled in the storage tank 310. However, if there is a perforated hole 530 that is not normally submerged in the substrate processing liquid in the storage tank 310, a problem in that the substrate processing liquid formed in the hole is contaminated may occur. Therefore, in this embodiment, the size of the margin region 560 in the partition wall 520 may be determined in consideration of the amount of the substrate processing liquid to be filled in the storage tank 310 so that all of the perforated holes 530 can be normally submerged in the substrate processing liquid.

On the other hand, the dimensions of the storage tank 310 and the perforated partition wall therein are not limited, and it is based on applying the optimum conditions in terms of agitation and sloshing prevention and recovery.

The substrate processing liquid providing apparatus 120 for supplying the substrate processing liquid to the inkjet head unit 240 is fixed to either one of the X-axis and the Y-axis of the inkjet facility and is placed in a speed/acceleration environment during printing. In the printing environment, the sloshing of the ink filled in the storage tank 310 may cause meniscus imbalance of the inkjet head, and the delay in waiting time for sloshing stabilization may affect the total process time delay. In addition, during the inkjet printing process, the inflow of bubbles generated from the empty space after the discharge of the head may grow in the conduit to cause clogging of the head.

The present invention relates to an ink supply apparatus having a slit-type sloshing recovery structure and a circulation agitating structure, that is, a substrate processing liquid providing apparatus 120, wherein the substrate processing liquid providing apparatus 120 may have a suppress/recovery structure for sloshing due to movement of a head shaft.

In addition, the substrate processing liquid providing apparatus 120 may have a sloshing recovery structure having a bubble trap function inside the supply reservoir module including a self-pump circulation system for agitation, and may be provided as a supply reservoir, to which a perforated slit e is applied, having an optimal structure in the correlation between sloshing recovery and securing internal agitation fluidity.

In addition, the substrate processing liquid providing apparatus 120 may include an ink tank, a rotating impeller, an electromagnet for rotating the impeller, an electric box for supplying power to the electromagnet, a water level measurement sensor, a sloshing prevention and sloshing recovery structure, and makes volume division through the partition wall inside the reservoir so that internal ink sloshing can be suppressed or sloshing recovery time can be shorten. In addition, the substrate processing liquid providing apparatus 120 may have a structure, in which perforations or slits are arranged in a limited size, in order to have a structure that does not inhibit the agitating fluidity while suppressing the sloshing of the internal ink.

Next, a method of processing a substrate using the substrate processing liquid providing apparatus 120 including the storage tank 310, the first pump 330, and the second pump 340 and the inkjet head unit 240 will be briefly described.

Figure 22:
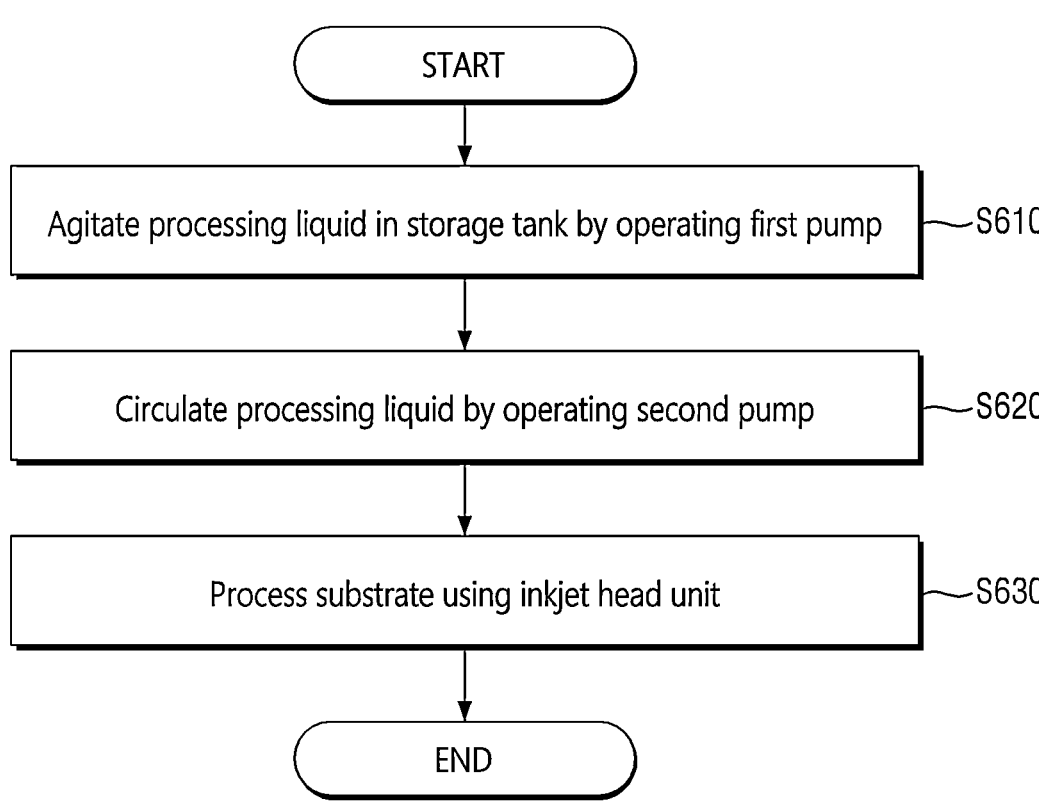
FIG. 22 is a flowchart sequentially illustrating a substrate processing method of a substrate processing system according to an embodiment of the present invention.

FIG. 22 is a flowchart sequentially illustrating a substrate processing method of a substrate processing system according to an embodiment of the present invention. The following description refers to FIG. 22.

When the substrate processing liquid is supplied to the storage tank 310 from a tank separately provided outside, the first pump 330 is operated to agitate the substrate processing liquid in the storage tank 310 (S610).

Thereafter, when the processing target substrate G is disposed on the first stage 211 of the process processing unit 210, the second pump 340 is operated so that the substrate processing liquid circulates the storage tank 310 and the inkjet head unit 240 (S620).

Thereafter, when the substrate processing liquid circulates between the storage tank 310 and the inkjet head unit 240, the inkjet head unit 240 discharges the substrate processing liquid provided from the storage tank 310 onto the substrate G so that the substrate G is processed (S630).

Although the embodiments of the present invention have been described above with reference to the accompanying drawings, the present invention is not limited to the above embodiments, but may be manufactured in a variety of different forms, and those of ordinary skill in the art to which the present invention pertains can understand that the present invention may be embodied in other specific forms without changing the technical spirit or essential features of the present invention. Therefore, it should be understood that the embodiments described above are illustrative in all respects and not limiting.

What is claimed is:

1. An apparatus for providing substrate processing liquid comprising:
   a storage tank for storing substrate processing liquid; and
   a plurality of partition walls installed inside the storage tank and for dividing an internal space of the storage tank,
   wherein the apparatus is connected to a substrate processing apparatus for discharging the substrate processing liquid onto a substrate to provide the substrate processing liquid to the substrate processing apparatus,
   wherein the plurality of partition walls includes a plurality of holes formed passing through one surface and an other surface of the plurality of partition walls, and
   wherein at least one of the plurality of partition walls includes a margin region, in which the plurality of holes are not formed, and an upper part of the margin region positioned above the plurality of holes is larger than a side part of the margin region positioned on a left or right of the plurality of holes.

2. The apparatus of claim 1, wherein at least one of the plurality of the partition walls is coupled to a cover covering an upper portion of the storage tank.

3. The apparatus of claim 1, wherein material of the plurality of the partition walls is different according to a type of the substrate processing liquid.

4. The apparatus of claim 1, wherein sizes of the plurality of the partition walls are different according to an inner diameter or area of the storage tank.

5. The apparatus of claim 1,
   wherein the plurality of partition walls are disposed at equal intervals.

6. The apparatus of claim 1 further comprises, a first tube for inflowing the substrate processing liquid circulated between the storage tank and the substrate processing apparatus into the storage tank.

7. The apparatus of claim 6, wherein one or more of the plurality of holes formed to the same height as an inlet of the first tube, or is formed to a height lower than the inlet.

8. The apparatus of claim 6 further comprising:

a second tube for discharging the substrate processing liquid stored in the storage tank to the substrate processing apparatus, wherein an inlet of the first tube is disposed above an outlet of the second tube.

9. The apparatus of claim 8, wherein one or more of the plurality of holes are formed up to the same height as an outlet of the second tube, or is formed up to a height higher than the outlet.

10. The apparatus of claim 1 further comprising:

a first pump for agitating the substrate processing liquid stored in the storage tank; and a second pump for circulating the substrate processing liquid between the storage tank and the substrate processing apparatus.

11. The apparatus of claim 10, wherein the second pump is disposed below the first pump.

12. The apparatus of claim 10, wherein the first pump is a magnetic pump operating in a magnetic levitation method.

13. The apparatus of claim 10, wherein the first pump operates in response to the substrate processing liquid containing a particle of a predetermined size or larger.

14. A method for processing a substrate comprising:

agitating substrate processing liquid stored in a storage tank using a first pump;

circulating the substrate processing liquid between the storage tank and the substrate processing apparatus using a second pump; and processing a substrate using the substrate processing apparatus, wherein a plurality of partition walls are installed inside the storage tank to divide an internal space of the storage tank, and wherein at least one of the plurality of partition walls includes a margin region, in which a plurality of holes are not formed, and an upper part of the margin region positioned above the plurality of holes is larger than a side part of the margin region positioned on a left or right of the plurality of holes.

* * * * *